Feb. 13, 1962    H. HALDEMANN    3,021,463
AUTOMATIC CURVE SENSING SYSTEM
Filed March 24, 1958    4 Sheets-Sheet 2
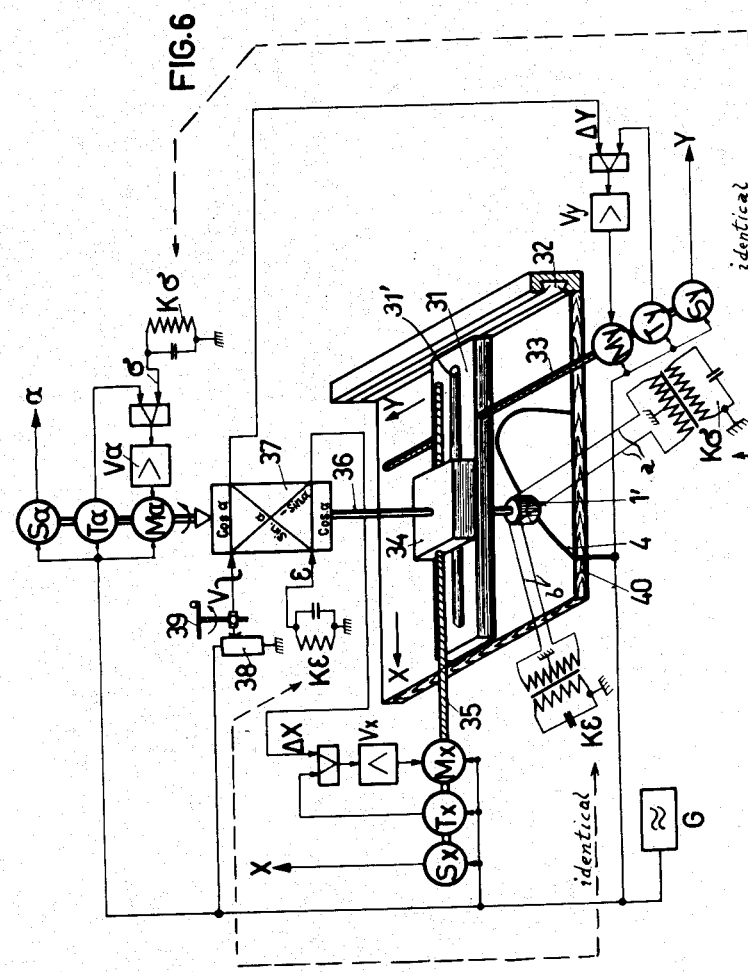

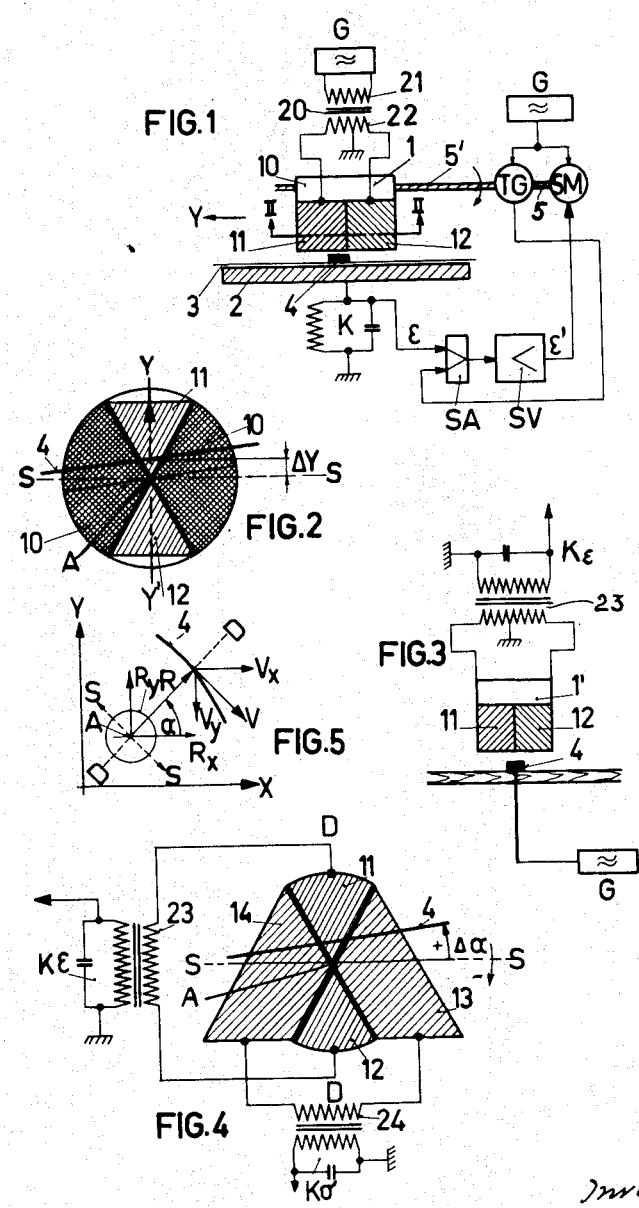

United States Patent Office 3,021,463
Patented Feb. 13, 1962

3,021,463
AUTOMATIC CURVE SENSING SYSTEM
Heinz Haldemann, Zurich, Switzerland, assignor to
Contraves A.G., Zurich, Switzerland
Filed Mar. 24, 1958, Ser. No. 723,516
Claims priority, application Switzerland Mar. 22, 1957
14 Claims. (Cl. 318—162)

The present invention refers to sensing devices, and more particularly to devices adapted to sense or follow a given graph curve and thereby to furnish data for controlling other devices or their operation.

The subject of the present invention is a device comprising a carrier for a suitably represented graph curve defining the functional relation between two quantities, and a sensing device therefor, movable relative to this carrier.

Such curve sensing systems form an essential basis for the automatic control of production equipment such as machine tools, apparatus for the manufacture of chemical industrial products, or air conditioning equipment, to mention only some important examples. However, such curve sensing systems are used with advantage also for the theoretical analysis of experimentally determined relations between two quantities registered by a graphic recorder, by means of analogue computer machines, for example for the purpose of Fourier analysis or for resolving the two quantities into other components.

It can be readily realized that for a mechanical sensing system the curve representing a given function must first be embodied in a mechanical element, for example in a bent wire or a cam disc, so that the shape of the curve may be mechanically sensed by a feeler.

Electro-optical sensing systems have also become known, in which the optical contrast of a graph curve with its environment is used in guiding an electro-optical sensing system having differential photo-electric cells along the curve. Such electro-optical systems give satisfactory results when utilizing transparencies, i.e., films as the carriers of a graph representing a function. It is, however, highly desirable to be able to sense automatically also a curve drawn on paper.

Now, with electro-optical curve sensing systems based on the phenomenon of reflection the difficulty has been encountered that it is not easy to obtain a sufficient contrast between the reflectivity of the curve drawn with the usual inks or India inks and the reflectivity of the paper base which fact entails the necessity of using comparatively strong light sources or of elaborate circuits for the photo-electric cell current amplifier arrangements. Generally, such electro-optical curve sensing systems are involved, heavy and exposed to the occurrence of breakdowns.

It is therefore a main object of this invention to provide a sensing device which would be free of the drawbacks of known devices of this kind.

According to the present invention the sensing device comprises as an essential component a differential condenser arrangement, the electrical field distribution of which is influenced by the layer of material forming the graph curve and constituting part of this condenser arrangement. Without difficulty special inks can be used for tracing the line, the material of which produces a graph line constituting either a conductive metallic layer (e.g., silver powder inks) or a layer having an extremely high dielectric constant, so that in both cases the ink layer of the graph sufficiently influences the electric field in the differential condenser arrangement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a diagrammatic sectional elevation of a sensing system, partly shown as an electric block diagram, the section taken along line Y—Y' of FIG. 2;

FIG. 2 is a section view, of the sensing head, from below, the section being taken along the line II—II of FIG. 1;

FIG. 3 shows a portion of an arrangement similar to that of FIG. 1, with a layer representing a curve and constituting part of a condenser arrangement;

FIG. 4 is an illustration analogous to FIG. 2, but showing a sensing head according to FIG. 3;

FIG. 5 is a plan view of a portion of a curve graph with the center A of the sensing head according to FIG. 2 or 4 in an offset position;

FIG. 6 is a perspective, partly diagrammatic illustration of a complete sensing device according to the invention;

Figure 7:
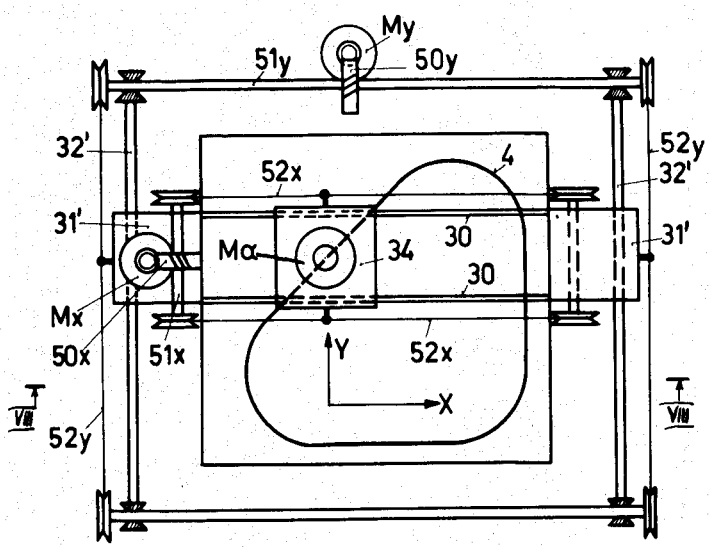
FIG. 7 shows the operation of a device according to FIG. 6 in plan view.

According to FIGS. 1 and 2 a sensing head 1 comprises two electrode bodies 11 and 12 of triangular section embedded in an insulating mass 10, arranged symmetrically with respect to the dividing plane S—S (FIG. 2). The electrode bodies 11, 12 are insulated from one another and are connected to the secondary coil 22 (grounded in the center) of a transformer 20, the primary coil 21 of which is connected to the output of an alternating voltage generator G, so that the lower faces of the two electrodes 11, 12, lying in a common plane, form the layers of a plane condenser, a voltage $+U_g \sin \omega t$ being applied to one of them, and a voltage $-U_g \sin \omega t$, to the other wherein $U_g$ is the maximum absolute value of the amplitude, and $\omega t$ is the phase angle of the alternating voltage generated in said secondary coil 22. Opposite these two triangular condenser layers lies the upper surface of a metal plate 2 as the third layer of a differential condenser, the plate 2 being connected to ground through a resonance oscillator circuit K.

On the plate 2, i.e. between the lower face of the sensing head 1 and the top surface of said plate 2 a paper strip 3 is inserted, on which a graph curve 4 is drawn, which consists either of a conductive metallic mass, being traced e.g. in silver ink, or conversely of a material having a particularly high di-electric constant (for example a synthetic resin mass).

In both cases the voltage $\epsilon$ in the resonance circuit K will have the value zero only when the central axis A of the sensing head 1 intersects the graph layer 4 in the center thereof. However, when this is not the case (see FIGS. 1 and 2) owing to the asymmetrical influence of the layer of the graph 4 on the field in the condenser system, a control voltage $\pm \epsilon \sin \omega t$ is generated in the resonance circuit K, the positive or minus sign applying to this voltage, i.e. its phase position, depending on the direction of the offset of the graph layer 4 from the center A, while its amplitude $\epsilon$, i.e. its magnitude, depends on the amount of this deviation.

From FIG. 2 it can be readily seen that the length of that piece of the curve which lies in the area of one or the other of the triangular layers 11 or 12 increases proportionally starting from zero, with increasing offset $\Delta Y$ from the center A. For this purpose, the two layers 11, 12 have the shape of triangles, the apices of which almost contact one another in the center A. On account of this, this amplitude $\epsilon$ of the control voltage $\epsilon$ increases with increasing offset $\Delta Y$, while it is practically zero, when the center A of the sensing head is above the center of the graph curve.

Such a control voltage is adapted to control a tachometrically counter-acting servo-motor drive system comprising an amplifier SV, a motor SM and a tachometer-generator TG driven by the output shaft 5 of the motor SM. The output voltage of this tachometer generator TG is added by an addition member SA to the control voltage $\epsilon$, and the sum of these voltages, amplified by the amplifier SV is fed as a control voltage $\epsilon'$ to the motor SM.

In accordance with the FIGS. 1 and 2 it is assumed for the sake of simplicity that the insulated carrier 10 of the sensing head 1 has an internal screw thread in mesh with an external screw thread portion 5' of the motor shaft 5 designed as a guide spindle, so that by turning the spindle 5 the sensing head 1 is displaced in a direction Y—Y' perpendicular to the plane of symmetry S—S thereof. This displacement takes place at a rate which is the higher, the greater is the error offset $\Delta Y$ of the center A of the sensing head from the center of the layer of the graph, and occurs in that direction which results in a reduction of this offset $\Delta Y$.

Be it assumed that on a paper strip 3 the graph curve 4 representing the function of an abscissa value $x$ in relation to an ordinate value $y$ is drawn; when this strip is now moved by any driving means in the direction of the abscissa, i.e. referring to FIG. 1, perpendicular to the plane of the drawing, the sensing head 1 or rather the center A thereof follows automatically the variations of the y-value. Since the instantaneous rotational position of the spindle shaft 5' corresponds under these circumstances to the value of the ordinate $y=f(x)$ associated by the curve with the corresponding value of the abscissa $x$, there are no difficulties in evaluating at another place the instantaneous values of the abscissa $x$ as well as the corresponding values of the associated ordinates $y$, by means of electrical teletransmission systems, either for the purpose of program control or for an analysis of the relation $y=f(x)$ as determined by the graph, by a computer device.

According to the FIGS. 3 and 4 a graph layer 4 formed as a metallic conductor is connected to one pole of a source of an alternating voltage G, with the lower face of the sensing head 1' in juxtaposition to it. In addition to the two triangular layers 11, 12, the opposed apices of which lie substantially in the center A, and which are formed symmetrical with respect to the dividing plane S—S as well as to the central plane D—D perpendicular thereto, the sensing head 1' comprises in this embodiment two further layers 13, 14 which are formed likewise symmetrical to the said central plane D—D, but are formed trapezium-shaped asymmetrically to the plane S—S.

According to the FIGS. 3 and 4, the layers 11 and 12 as well as the layers 13 and 14 are connected to the ends of one of the centrally grounded transformer coils 23 and 24, respectively, so that in the resonance circuits $K_\epsilon$ and $K_\sigma$, respectively, control voltages $\epsilon$ and $\sigma$ are induced. Exactly as in the case of the FIGS. 1 and 2, the control voltage $\epsilon$ corresponds regarding its positive or negative sign to the direction, and regarding its amplitude to the magnitude of the offset of the graph curve 4 from the center A, while the control voltage $\sigma$ indicates by its phase position the positive or negative sign and by its amplitude the magnitude of the angular deviation $\pm \Delta \alpha$ between the direction of the graph curve and the direction of the plane S—S. How these control voltages $\epsilon$, $\sigma$ can be evaluated will be explained below with reference to FIG. 6. However, first reference will be had to FIG. 5.

The same represents a graph curve 4 in a Cartesian co-ordinate system X—Y.

In the field contemplated, a sensing head is represented by its center A and said planes S—S and D—D, and it is assumed that a rotary servo-motor system has turned the sensing head in such a manner, as will be described below, that the central plane D—D extends in a direction perpendicular to the graph curve 4. The angle $\alpha$ then indicates the angle between the plane D—D of the sensing head and the X-direction. The offset of the center A from the curve 4 in the direction of D—D as ascertained by the layers 11 and 12 may have the value R, the components in the X and Y direction of which accordingly have the values, respectively, of:

$$Ry = R \sin \alpha$$
$$Rx = R \cos \alpha$$

On the other hand it is demanded that the center A of the sensing head should follow the graph curve at the tangential velocity V, the components in the the X and Y-directions, respectively, have the values:

$$Vx = V \sin \alpha$$
$$Vy = -V \cos \alpha$$

Accordingly, when the center A of the sensing head is to be moved in the X and Y direction, respectively, by two tachometrically counter-acting drives, the corresponding control components $\Delta y$ and $\Delta x$ have to fulfill the following conditions:

$$\Delta y = R \sin \alpha - V \cos \alpha$$
$$\Delta x = R \cos \alpha + V \sin \alpha$$

According to FIG. 6 a bar 31 may be shifted to-and-fro in its guide 32 by the threaded control spindle 33 of a servo-motor My in the Y-direction of a Cartesian co-ordinate system. On the other hand in a guide slot 31' formed in said bar 31 the plate 34 is slidable in the X-direction of the co-ordinate system, namely by means of the threaded control spindle 35 of the servomotor Mx.

The plate 34 is crossed perpendicularly by a rotatable shaft 36, which carries underneath the plate 34 a sensing head 1' according to the FIGS. 3 and 4, and is connected above the plate to a servo-motor M$\alpha$ as well as to a "transformation eight-pole" 37, known per se, as an analogue computer element. On the shafts 33, 35, 36 of the motors My, Mx, M$\alpha$ the tachometer generators Ty, Tx, T$\alpha$, respectively, and the synchronous transmitters Sy, Sx, S$\alpha$, respectively, are mounted. From a generator G the three drive systems as well as a voltage divider 38 having a manual adjusting member e.g. hand wheel 39 are supplied with an alternating voltage (for example of a frequency of 400 cycles per second).

Moreover, the graph curve 4 consisting of a conductive layer of a metallic mass situated on the drawing board 40 is connected to this generator, so that for the arrangement of the sensing head 1' with respect to the graph curve 4 the conditions according to FIGS. 3 and 4 prevail.

Through slide contacts, not shown, connections $a$, and by means of a differential wiring arrangement the control voltage $\sigma$ is produced by the layers 13 and 14 in the resonance circuit K$\sigma$ and is supplied to the tachometrically counter-acting servo-motor system comprising the motor M$\alpha$, the tachometer generator T$\alpha$ and the amplifier V$\alpha$, the sensing head being always rotationally or angularly adjusted by the shaft 36 in such a manner that its plane D—D extends perpendicular to the graph curve 4 (see FIG. 5).

By operation of the hand wheel 39 of the voltage divider 38 a desired tangential velocity is determined by selecting an electrical voltage of desired value which is fed to one input point of the "transformation eight-pole" 37. To the other input point of this "transformation eight-pole" the control voltage $\epsilon$ is applied (preferably via a pre-amplifier) which is derived from the layers 11, 12 through line $b$ and is obtained by means of a differential arrangement in the resonance circuit K$\epsilon$. At the output points of the "transformation eight-pole" 37 as adjusted angularly by the shaft 36 the desired control voltage components are formed as follows:

$$\Delta Y = -V \cos \alpha + R \sin \alpha$$

and $$\Delta X = +V \sin \alpha + R \cos \alpha$$

which are passed on to the servo-amplifiers V$y$ and V$x$, respectively, of the tachometrically counter-acting servo-drive systems of the spindles 33 and 35, respectively, having the motors M$y$, M$x$ and tachometer generators T$y$, T$x$, respectively.

In this manner the center A of the sensing head 1 is caused to follow at a constant tangential velocity V the graph curve 4 situated on the drawing board 40, and always to assume such a rotational position, that its central plane D—D is orientated in a direction perpendicular to the tangent of the graph curve at the particular point. It is then easily possible by the aid of synchronous transmitters S$y$, S$x$ and S$\alpha$, respectively, which are mounted on the shafts 33, 35, 36, respectively, to transmit the values of $y$, $x$ and $\alpha$ to another device, e.g. to a production machine. In this manner e.g. plates can be cut directly and automatically in accordance with the shape drawn as a graph curve 4 on the board 40, by means of a copying oxyacetylene cutter which is remote-controlled by a device according to FIG. 6.

Figure 8:
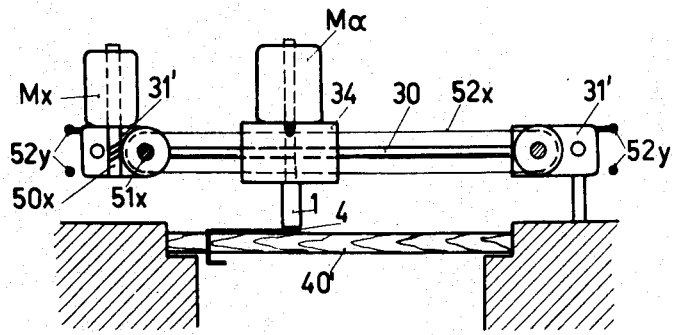
FIG. 8 shows the operation of a device according to FIG. 6 in elevation.

The embodiments according to the FIGS. 7 and 8 corresponds substantially to that according to FIG. 6.

The plate 34 is movable in the X direction on guide rods 30 of the bar 31', and the bar 31' itself is movable in the Y direction on stationary guide rods 32'.

The motors M$x$ and M$y$ each drive through a worm gear device 50$x$ and 50$y$, respectively, the shafts 51$x$ and 51$y$, respectively, which drive twin cord drives 52$x$ and 52$y$ for moving the components 34 and 31', respectively.

Figure 9:
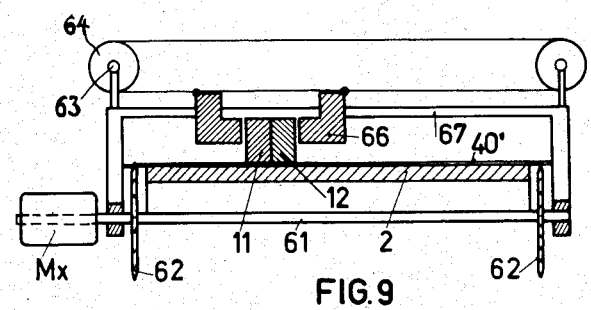
FIGS. 9, 10 show a simplified device in plan view and elevation, respectively.
Figure 10:
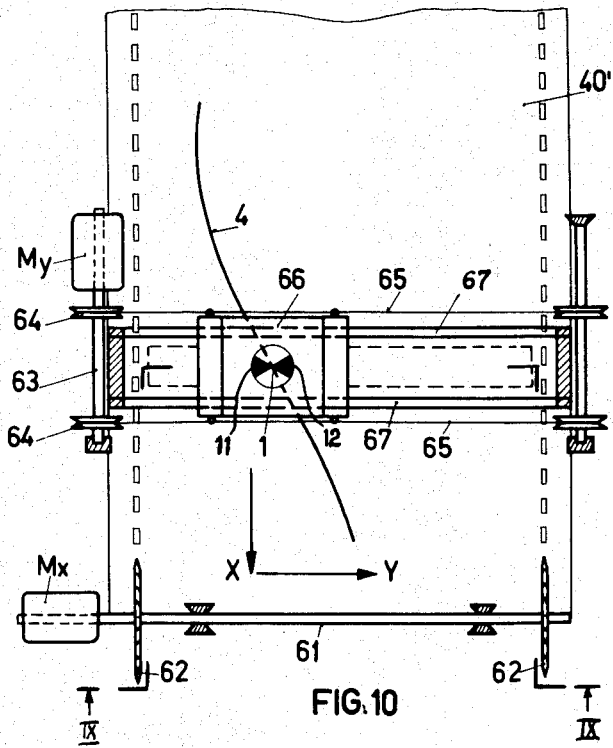

The simplified embodiment according to the FIGS. 9 and 10 corresponds to the FIGS. 1 and 2.

By a shaft 61 driven by a motor M$x$ at constant rotational speed or in dependence of any variable quantity $x$, a paper strip 40', perforated along the edges, is moved along in the direction of the abscissa X.

Two cord drive pulleys 64 mounted on the shaft 63 are driven by the aid of a servo-motor M$y$ and the shaft 63 so that the pull cords 65 driven by the pulley 64 shift the carrier 66 in the Y-direction along the guide rods 67, the sensing head 1 provided with the layers 11 and 12, described with reference to the FIGS. 1 and 2, being mounted on the carrier 66.

The plate 2 from which the control voltage for the motor M$y$ is derived, corresponds to that according to FIG. 1. The operation of the device shown by FIGS. 9 and 10 is analogous to that of the device shown by FIGS. 1 and 2.

The principle underlying the various embodiments of devices for capacitatively sensing a graph curve by means of a sensing head acting as a differential condenser may also be used in modified embodiments. For example it may be advantageous to feed the capacitative sensing system with high frequency alternating voltage (100 kilocycles per second), while from the primarily obtained control voltages control signals of lower frequency for the servo-motors may be derived.

It will be understood that each of the elements described above, or two or more together, may also find a useful application in other types of sensing devices differing from the types described above.

While the invention has been illustrated and described as embodied in sensing devices for securing a given curve, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalance of the following claims.

What is claimed as new and desired to be secured by Letters Patent is:

1. In a sensing system for electrically sensing the configuration of a given lineal object, particularly of a graph curve of any shape related to two coordinates and representing the functional relation between two quantities, in combination, a source of alternating voltage; two-plate differential condenser means having a reference center and being connected in circuit with said source; supporting means adapted to carry on one face a lineal object in a position adjacent to but spaced from and opposite said condenser means, said condenser means including two substantially triangular condenser plates, each being bounded on two sides by edges diverging at an angle from said reference center and insulated from each other, said plates being arranged with faces, respectively, in a common plane substantially parallel with said face of said supporting means, and symmetrically with respect to a center plane perpendicular to said common plane and passing through said reference center; a lineal object representing said graph curve and carried by said supporting means and consisting of a material adapted to cause an unbalance of the electric field of said condenser when at least that portion of said lineal object which is located opposite said condenser is in a position other than substantially in alignment with said reference center; moving means for moving said condenser means and said supporting means carrying said lineal object, relative to one another; and electrical control means operatively connected between said condenser means and said moving means for controlling the latter depending upon said unbalance so as to operate said moving means in a manner causing said portion of said lineal object to assume a position substantially in alignment with said reference center.

2. A sensing system as claimed in claim 1, said supporting means being substantially made of a material having a predetermined degree of electric conductivity including zero conductivity, and said lineal object carried by said supporting means consisting of a material having a conductivity sufficiently different from that of said supporting means to make it adapted to cause an unbalance of the electric field of said condenser when at least that portion of said lineal object which is located opposite said condenser is in a position other than substantially in alignment with said reference center.

3. A sensing system as claimed in claim 1, said lineal object carried by said supporting means consisting of an electrically conductive material.

4. A sensing system as claimed in claim 1, said lineal object carried by said supporting means consisting of a material having a particularly high dielectric constant.

5. A sensing system as set forth in claim 1, said supporting means being non-conductive and said lineal object being made of conductive material and conductively connected to said source of alternating voltage, and inductance means connected with said condenser means to form therewith differential oscillator means capable of producing a control voltage for operating said moving means.

6. A sensing system as set forth in claim 1, said supporting means including a carrier member made of non-conductive material and carrying said lineal object, and a support member made of conductive material and located opposite said differential condenser means for being capable of acting as a third condenser plate, said carrier member carrying said lineal object being movable between said support member and said differential condenser means independently of any movement of the latter.

7. A sensing system as set forth in claim 1, wherein said condenser means includes two additional condenser plates arranged in the same plane as said two triangular condenser plates and insulated therefrom and from each other, said additional condenser plates being arranged within the angular spaces existing between said triangular plates; and bounded on two sides by edges diverging at an angle from said reference center, said additional condenser plates being shaped asymmetrical with respect to said center plane, but symmetrical with respect to a second central plane perpendicular both to said center plane and to said common plane, and passing through said reference center, so that the electric field of said two additional condenser plates is unbalanced depending on, and in proportion to an angle included between the direction of said portion of said lineal object, and said second central plane.

8. A sensing system as set forth in claim 6, wherein said lineal object is a graph curve related to two coordinates, said carrier member being movable in the direction of one of said coordinates, while said differential condenser means is movable by said moving means in the direction of the other one of said coordinates; and wherein said control means include circuit means connected in series between said conductive support member and said moving means, and being capable of translating an alternating voltage applied thereto by said source via said condenser means into a control voltage for controlling said moving means, said control voltage depending upon the degree and direction of the out-of-alignment position of said reference center with respect to the center of said lineal object at the particular moment.

9. A sensing system as set forth in claim 8, said differential condenser means including two condenser plates arranged symmetrically with respect to said reference center and connected in opposed phase relation to said source of alternating voltage.

10. A sensing system as set forth in claim 5, said lineal object being a graph curve related to two predetermined coordinates, and said supporting means being stationary, said differential condenser means being movable independently in either one of the directions of said two coordinates, and said moving means being arranged to effect the movement in one of said coordinate directions under the action of said control means.

11. A sensing system as set forth in claim 10, said oscillator means being capable of producing a control voltage depending in its phase position on the direction, and in its magnitude on the degree, of the out-of-alignment position of said reference center with respect to the center of said lineal object whenever such out-of-alignment position occurs.

12. A sensing system as set forth in claim 7, including first inductance means connected with said two triangular condenser plates to form therewith first differential oscillator means, and second inductance means connected with said additional condenser plates to form therewith second differential oscillator means, said first oscillator means being capable of producing a first control voltage depending in its phase position on the direction, and in its magnitude on the degree, of the out-of-alignment position of said reference center with respect to the center of said lineal object of the particular moment, and said second oscillator means being capable of producing a second control voltage depending, in its phase position, on the direction, and in its magnitude, on the amount of said angle included between the direction of said portion of said linear object and said second central plane, said oscillator means being connected with said control means for applying thereto said control voltages so as to actuate said control means.

13. A sensing system as set forth in claim 12, including second moving means for turning said differential condenser means about an axis perpendicular to said common plane, said control means including circuit means for applying said second control voltage to said second moving means.

14. A sensing system as set forth in claim 13, including a component resolver means having two input terminals, one of which is connected to said first oscillator means, and serving as a trigonometrical analogue computer member, said member being mounted for turning movement jointly with said differential condenser means so as to assume at all times an angular position about said axis substantially identical with said angle included between the direction of said portion of said lineal object and said second central plane, said member further having two output terminals connected to said first and second control means, respectively; voltage control means in circuit between said source of alternating voltage and said computer member for deriving from said alternating voltage a third control voltage and for adjusting the velocity of said differential condenser means along said linear object by applying said third control voltage to one of said input terminals, said member being capable of converting said third control voltage and said first control voltage derived from said two triangular condenser plates through said first oscillator means into corresponding control components and of delivering the same via said output terminals to said control means for causing said moving means to move said differential condenser means in the direction of said coordinates, respectively.

References Cited in the file of this patent

UNITED STATES PATENTS

| | | |
|---|---|---|
| 2,590,091 | Devol | Mar. 25, 1952 |
| 2,611,115 | Johnston | Sept. 16, 1952 |
| 2,679,620 | Berry | May 25, 1954 |
| 2,721,989 | Gates | Oct. 25, 1955 |
| 2,835,858 | Moseley | May 20, 1958 |